US011414110B2

(12) United States Patent
Yamamoto

(10) Patent No.: US 11,414,110 B2
(45) Date of Patent: Aug. 16, 2022

(54) TRAIN MONITORING SYSTEM

(71) Applicant: HITACHI KOKUSAI ELECTRIC INC., Tokyo (JP)

(72) Inventor: Yohei Yamamoto, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 17/434,233

(22) PCT Filed: Dec. 10, 2019

(86) PCT No.: PCT/JP2019/048318
§ 371 (c)(1),
(2) Date: Aug. 26, 2021

(87) PCT Pub. No.: WO2020/179167
PCT Pub. Date: Sep. 10, 2020

(65) Prior Publication Data
US 2022/0089205 A1  Mar. 24, 2022

(30) Foreign Application Priority Data

Mar. 4, 2019 (JP) .............................. JP2019-038352

(51) Int. Cl.
*B61L 23/04* (2006.01)
*G06V 20/58* (2022.01)
(Continued)

(52) U.S. Cl.
CPC .......... *B61L 23/041* (2013.01); *B61L 15/009* (2013.01); *B61L 15/0018* (2013.01); *B61L 23/34* (2013.01);
(Continued)

(58) Field of Classification Search
CPC .. B61L 23/041; B61L 15/0018; B61L 15/009; B61L 23/34; B61L 25/021; G06V 20/58; H04N 5/232
(Continued)

(56) References Cited

U.S. PATENT DOCUMENTS

2010/0002080 A1   1/2010  Maki
2013/0046421 A1*  2/2013  El Fassi ................ B61L 23/041
                                                    701/2
(Continued)

FOREIGN PATENT DOCUMENTS

EP   3 349 440 A1   7/2018
GB   2556942 A      6/2018
(Continued)

OTHER PUBLICATIONS

International Search Report dated Mar. 10, 2020.
Dopy of Extended European Search Report cited in European Patent Appln. No. 1 917 798.1.

*Primary Examiner* — Tung T Vo
(74) *Attorney, Agent, or Firm* — Bacon & Thomas, PLLC

(57) ABSTRACT

There is provided a train monitoring system using a train monitoring device that is mounted on a train and uses a plurality of cameras for imaging around the train from different sides. The train monitoring device includes a control unit that is configured to, when the train stops at a station, select one of the plurality of cameras as a rear imaging camera for imaging a rear side in a traveling direction of the train, after the train departs from the station, acquire image data imaged by the rear imaging camera, and transmit the image data to the outside.

12 Claims, 4 Drawing Sheets

(51) Int. Cl.
 *H04N 5/232* (2006.01)
 *B61L 15/00* (2006.01)
 *B61L 23/34* (2006.01)
 *B61L 25/02* (2006.01)

(52) U.S. Cl.
 CPC ............ *B61L 25/021* (2013.01); *G06V 20/58* (2022.01); *H04N 5/232* (2013.01)

(58) Field of Classification Search
 USPC ........................................................ 348/148
 See application file for complete search history.

(56) References Cited

U.S. PATENT DOCUMENTS

| | | | |
|---|---|---|---|
| 2018/0201285 A1* | 7/2018 | Brooks | B61C 17/00 |
| 2018/0257684 A1 | 9/2018 | Fischer et al. | |
| 2019/0039633 A1* | 2/2019 | Li | B61L 23/045 |
| 2020/0023790 A1* | 1/2020 | Hirai | B60R 11/04 |
| 2020/0213519 A1* | 7/2020 | Saito | B61L 23/04 |
| 2020/0280699 A1* | 9/2020 | Omori | B61L 15/009 |
| 2020/0349743 A1* | 11/2020 | Kitamura | B61L 23/04 |
| 2021/0197816 A1* | 7/2021 | Horn | B62J 27/00 |

FOREIGN PATENT DOCUMENTS

| | | |
|---|---|---|
| JP | 2010-35159 A | 2/2010 |
| JP | 2018-113602 A | 7/2018 |
| WO | WO2018/173694 A1 | 9/2018 |
| WO | 2019/102935 A1 | 5/2019 |

* cited by examiner

TRAIN MONITORING SYSTEM

TECHNICAL FIELD

The present invention relates to a train monitoring system for monitoring an operation state of a train.

BACKGROUND

A monitoring system using a monitoring camera (camera) is used to ensure safety in an operation of a train. In particular, securing safety in a platform of a station is important for the train operation.

Patent Document 1 discloses a monitoring system in which, in order to utilize a plurality of monitoring cameras fixed to a train, the plurality of monitoring cameras are installed on the train to correspond to doors on both lateral sides of a traveling direction; a screen display of a monitor mounted in the train is divided into multiple areas; and images of the respective monitoring cameras are displayed in the divided areas to secure safety at the time of opening and closing the doors. Here, the monitoring cameras of which images are displayed are automatically controlled to correspond to the doors that are opened and closed on a platform side of a station where the train stops. In this case, the areas where the respective monitoring cameras capture images are optimally set such that blind spots are not formed.

In addition, an emergency stop button is installed at the platform to notify the occurrence of emergency to a train crew or a station employee. For example, when a person falls from the platform to a railroad before a train enters, another person (station employee or the like) who recognizes this situation can press the emergency stop button to stop the train before the train enters the platform.
Patent Document 1: Japanese Laid-open Patent Publication No. 2018-113602

For example, when a person falls from the platform to the railroad at a portion immediately after the rear side of the train immediately after the train that has stopped at the platform starts to move, or when a person rolls over the platform, or when a person is in contact with the train at the platform, it is necessary to prevent a next train from entering the station for safety. However, it may be difficult to recognize this situation from a monitoring camera installed on the platform side.

By manipulating the emergency stop button, it is possible to enable the crew of the next train to recognize that an abnormality has occurred and to stop the next train. However, if this situation is not recognized by the station employee or the like, the occurrence of abnormality cannot be recognized by the crew of the next train or the like. Although a conductor of the train can visually recognize the situation, it is not possible to recognize the occurrence of abnormality in the case of a train that is driven by one person or driven automatically without a conductor.

As described above, in the prior art, it was not easy for a person in charge of the train operation to quickly recognize the abnormality that occurs around a train at a rear side (including a lateral side) of the train.

SUMMARY

In view of the above, an object of the present disclosure is to solve the above problems.

The present disclosure provides a train monitoring system using a train monitoring device that is mounted on a train and uses a plurality of cameras for imaging around the train from different sides, wherein the train monitoring device includes a control unit that is configured to: when the train stops at a station, select one of the plurality of cameras as a rear imaging camera for imaging a rear side in a traveling direction of the train; after the train departs from the station, acquire image data imaged by the rear imaging camera; and transmit the image data to the outside.

Further, the train monitoring device may include an image analyzing unit configured to recognize abnormality based on the image data, and a display unit configured to display the image data. The control unit may notify the display unit or the outside of an alarm when the image analyzing unit recognizes the abnormality.

Further, in the train, a first front camera of the cameras configured to image one end side at one end in the traveling direction and a second front camera of the cameras configured to image the other side at the other end in the traveling direction may be installed. In the train monitoring device, the control unit may set one of the first front camera and the second front camera as the rear imaging camera depending on the traveling direction.

Further, in the train, a first side camera of the cameras configured to image one lateral side of the traveling direction and a second side camera of the cameras configured to image the other lateral side of the traveling direction may be installed together on both lateral sides with respect to the traveling direction. In the train monitoring device, the control unit may set one of the first side camera and the second side camera on both lateral sides as the rear imaging camera depending on the traveling direction and the positional relationship between the train and a platform.

Further, the train monitoring device may include a speed recognition unit configured to recognize a speed of the train. In the train monitoring device, the control unit may start imaging with the rear imaging camera when the speed recognized by the speed recognition unit reaches a first preset speed, and stop the imaging by the rear imaging camera when the speed reaches a second preset speed higher than the first preset speed and acquire the image data.

Further, the train monitoring device may transmit the image data to a central station fixed on the ground, and the central station may include an image analyzing unit configured to recognize abnormality based on the image data, and transmit an alarm to another train when the image analyzing unit recognizes the abnormality.

Effect of the Invention

In accordance with the present disclosure, it is possible to quickly notify a person in charge of train operation of an abnormality that occurs around a train at a rear side of a train.

DETAILED DESCRIPTION

Figure 1:
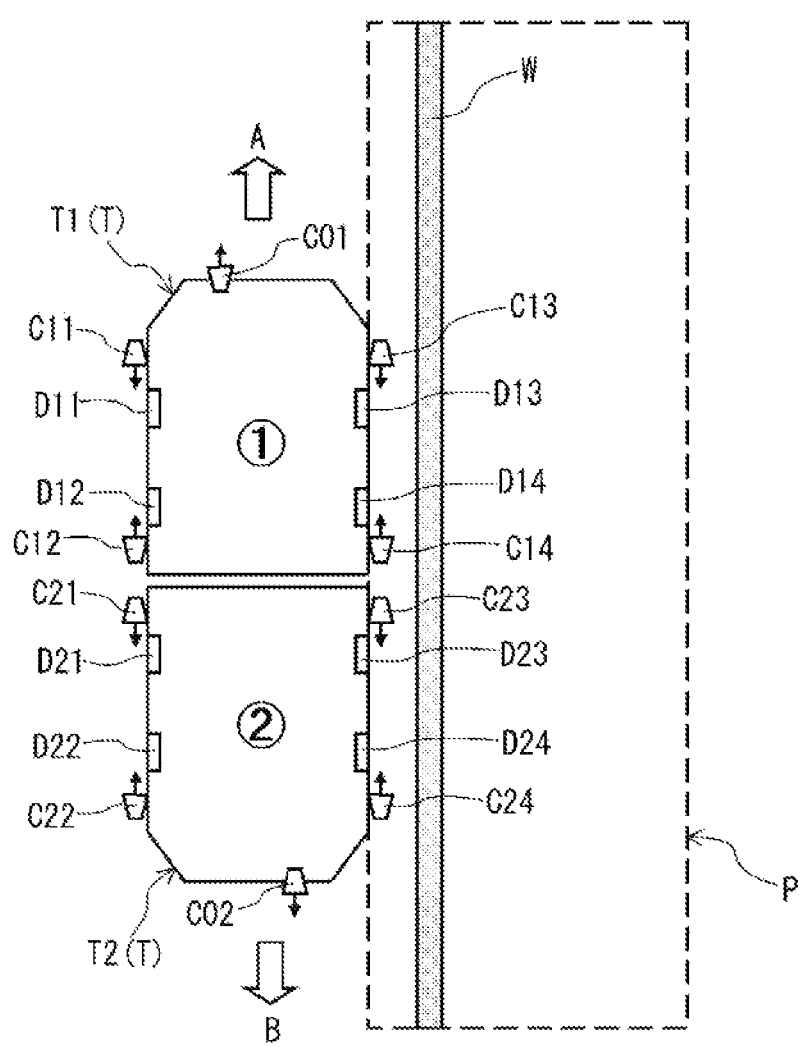
FIG. 1 shows a configuration of a train using a train monitoring system according to an embodiment.

Hereinafter, embodiments of the present disclosure will be described in detail with reference to the accompanying drawings. In a train monitoring system according to an embodiment of the present disclosure, train monitoring devices are mounted in a plurality of trains and connected through a network. FIG. 1 schematically shows a configuration of a single train T in which the train monitoring system (train monitoring device) is used. FIG. 1 schematically shows a configuration of the train T viewed from the top. Here, it is assumed that the train T has a configuration in which a first railroad car T1 and a second railroad car T2 are connected and travels upward or downward in FIG. 1. Doors that are opened and closed when passengers get on and off include doors D11 and D12 on the left side and doors D13 and D14 on the right side of the first railroad car T1 in FIG. 1, and doors D21 and D22 on the left side and doors D23 and D24 on the right side of the second railroad car T2 in FIG. 1. Depending on whether the platform P of the station at which the train T stops is located on the left side or on the right side in FIG. 1, one of the combination of the doors D11, D12, D21, and D22 and the combination of the door D13, D14, D23, and D24 which is located on the platform side is selected to perform an opening/closing operation when the train T stops, and the other door combination is maintained in a closed state.

Further, the traveling direction of the train T is set to any one of an arrow A direction (upward in FIG. 1) and an arrow B direction (downward in FIG. 1), and train crews get on the front of the first railroad car T1 and the second railroad car T2. In FIG. 1, the platform P of the station is on the right side when the traveling direction is the arrow A direction. In this case, the combination of doors D13, D14, D23, and D24 is opened and closed when the train stops.

FIG. 1 shows the arrangement of a plurality of monitoring cameras (cameras) used in the train monitoring device in the train T. Although FIG. 1 shows a plan view viewed from the top side, each monitoring cameras is actually installed near an upper portion of the train. In the first railroad car T1, monitoring cameras (cameras) C11 and C12 are installed on the left side (one lateral side) in FIG. 1, and monitoring cameras C13 and C14 are installed on the right side (the other lateral side) in FIG. 1. Similarly, in the second railroad car T2, monitoring cameras C21 and C22 are installed on the left side FIG. 1 and the monitoring camera C23 and C24 are installed on the right side in FIG. 1. The monitoring cameras are mainly classified into the monitoring cameras C12, C14, C22, and C24 serving as first side cameras for capturing images with respect to the upper side (one side) from the lower side (the other side) in FIG. 1, and the monitoring camera C11, C13, C21, and C23 serving as second side cameras for capturing images with respect to the lower side from the upper side in FIG. 1.

In the state of FIG. 1, the monitoring cameras C13 and C14 can recognize presence/absence of passengers between the first railroad car T1 and a braille block W in FIG. 1. Similarly, the monitoring cameras C23 and C24 can recognize presence/absence of passengers between the second railroad car T2 and the braille block W. When the platform P is located on the left side, safety can be checked using the monitoring cameras on the left side. In this case, if the train crew is located at the front of the first railroad car T1, for example, the image data viewed from the same viewpoint as that of the train crew is obtained using the second side cameras (the monitoring cameras C11, C13, C21, and C23), which makes it particularly easy to recognize the situation on the platform P.

Further, a monitoring camera (first front camera) C01 for capturing an image of the upper side in FIG. 1 is installed on the upper side in FIG. 1 (front) of the first railroad car T1, and a monitoring camera (second front camera) C02 for capturing an image of the lower side in FIG. 1 is installed on the lower side in FIG. 1 (front) of the second railroad car T2. When the train is traveling in the traveling direction A, the monitoring camera C01 can capture an image of the forward view. When the train is traveling in the traveling direction B, the monitoring camera C02 can capture an image of the forward view. The image data can be stored only for a certain period of time. Therefore, when the train T causes a collision accident or the like at an intersection, for example, this image data can be used to identify the cause of the accident or the like.

Figure 2:
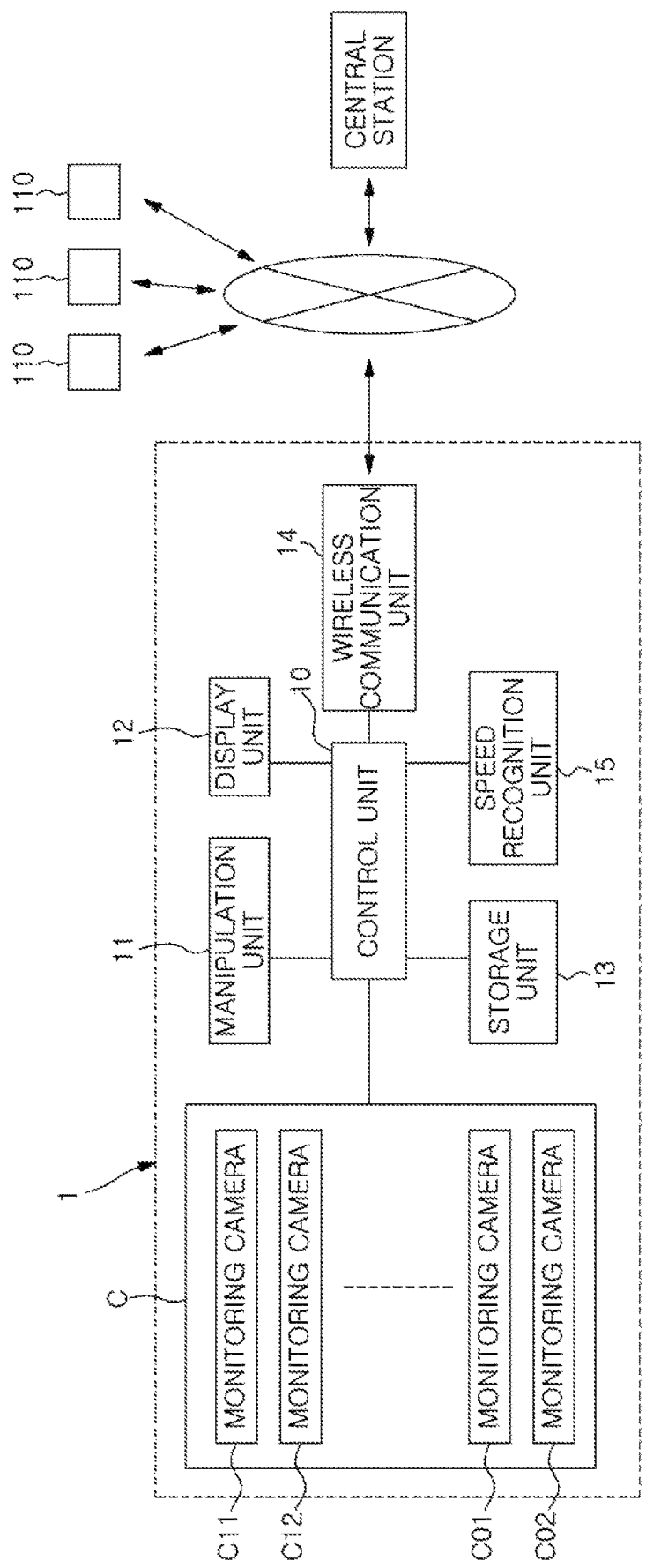
FIG. 2 is a block diagram showing configurations of the train monitoring system and a train monitoring device according to an embodiment.

FIG. 2 shows the configuration of the entire train monitoring system using the train monitoring device 1. The train monitoring device 1 is mounted in the train T, and a control unit 10 (computer) for controlling the entire train monitoring device 1 is used. Actually, the control unit 10 is connected with various components so that various operations can be performed by the manipulation of a manipulation unit 11 by the train crew. However, only the components related to the present disclosure are shown in FIG. 2.

Since a train operation device (not shown) is also connected to the control unit 10, it is possible to recognize the situation of the train, such as the station where the train stops, which side the platform P of this station is on, the current opening/closing state of each door, or the like. As described above, depending on the station where the train stops, one of the combination of the doors D11, D12, D21, and D22 and the combination of the doors D13, D14, D23, and D24 is selected to perform the opening/closing operation and the other door combination is maintained in a closed state. The control unit 10 can recognize this situation.

A display unit 12 is used for displaying various types of information on the operation of the train T. The image displayed on the display unit 12 includes the image captured by the monitoring camera. Therefore, all the monitoring cameras (monitoring camera group C) are connected to the control unit 10. The control unit 10 may control the display unit 12 to display the image captured by the selected monitoring camera. In addition, a storage unit 13 is used for storing information required when the control unit 10 performs operations to be described later, the image data obtained by imaging, and the image data received from another train monitoring system 1. The storage unit 13 comprises a hard disk, a non-volatile memory, or the like.

Further, the control unit 10 is connected to a wireless communication unit 14 for transmitting various types of information including the image data obtained by the monitoring camera to an external device through the network N using wireless communication, or for receiving the same information from the external device.

A speed recognition unit 15 for recognizing a speed of the train is also connected to the control unit 10. Therefore, the control unit 10 can recognize a current speed of the train or whether or not the train is stopped.

A central station 100 and a plurality of mobile stations 110 are connected to the train monitoring device 1 through the network N and able to share information as described above. The mobile station 110 is actually the train monitoring device 1 mounted in another train traveling on the same route as that of the train T. This train includes a next train of the train T. In other words, the train monitoring system uses multiple train monitoring devices 1 mounted in different trains. The mobile stations 110 move along with respective trains, whereas the central station 100 is a server fixed on the ground and configured to manage the entire route of this train. The mobile stations 110 may not directly exchange information from one another, and may exchange information only through the central station 100.

Figure 3:
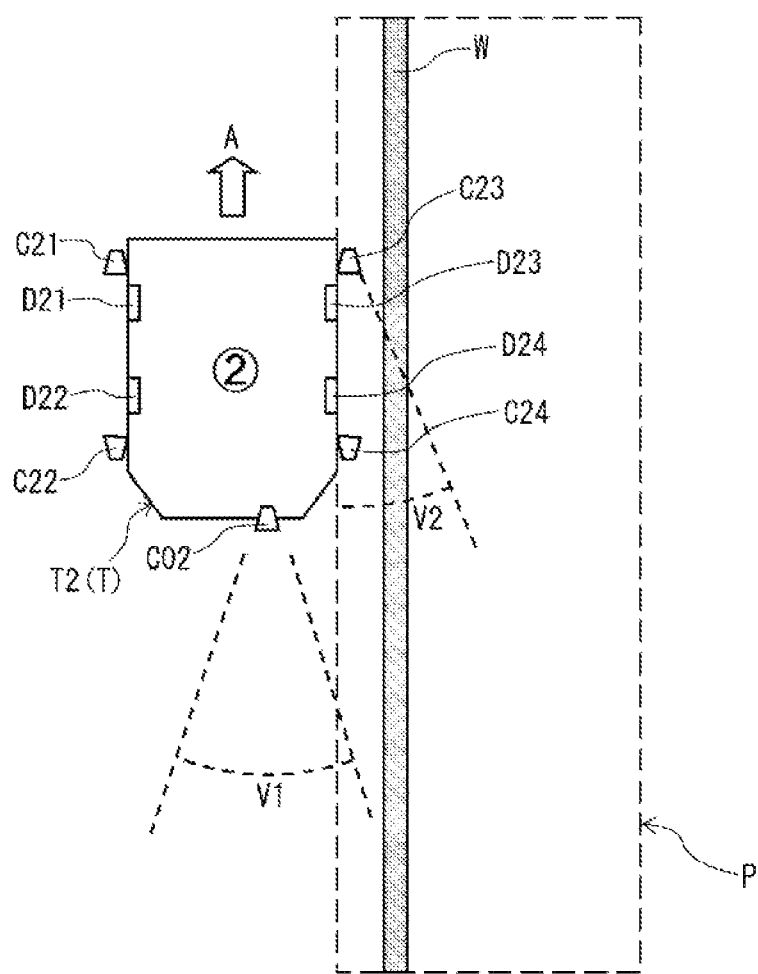
FIG. 3 shows a configuration in the case of imaging by the train monitoring system and the train monitoring device according to an embodiment.

The train monitoring device 1 selects a monitoring camera (rear imaging camera) for imaging a rearward view or a diagonal rearward view with respect to the traveling direction of the train among the monitoring cameras shown in FIG. 1, and transmits the image imaged by the monitoring camera to the outside using a wireless communication unit 14. FIG. 3 shows the imaging state in this case in association with FIG. 1. Here, it is assumed that the traveling direction of the train is the arrow A direction in FIG. 1. Therefore, the monitoring camera installed in the second railroad car T2 is used. In FIG. 3, only the second railroad car T2 is illustrated.

Here, the monitoring cameras C02 and C23 are selected as the rear monitoring cameras capable of imaging the rearward view (lower side in FIG. 3) from the second railroad car T2. In FIG. 3, the monitoring camera C02 has a field of view V1 and the monitoring camera C23 has a field of view V2 in plan view. Although FIG. 3 shows the plan view, the monitoring cameras C02 and C23 are actually fixed near the upper portion of the second railroad car T2, and the fields of view thereof are slightly downward in the vertical direction. Thus, the monitoring cameras C02 and C03 can image the railroad and the platform P including the braille block W, respectively, from the top. As the train T travels upward in FIG. 3, the regions imaged by the monitoring cameras C02 and C23 are moved upward in FIG. 3. Since the second railroad car T2 is located near the rearmost side of the platform P when the train stops, the monitoring cameras can image the railroad behind the rear side of the train and the platform P near the train from the topover substantially the entire region of the length of the platform P along the traveling direction.

In particular, when an abnormality occurs on the railroad or the platform P behind the rear side of the train T, e.g., when an object falls on the railroad or on an area closer to the train than the braille block W, this situation is captured in the image data obtained by the monitoring cameras as described above. Recognition of such situation is particularly important to a next train.

Therefore, the control unit 10 transmits the image data thus obtained to the central station 100 and the mobile station 110 through the network N using the wireless communication unit 14. Thus, the central station 100, the mobile station 110 corresponding to the next train, or the like can recognize this image likewise. In the next train, the train crew can check such situation on the display unit 12 of the next train.

Figure 4:
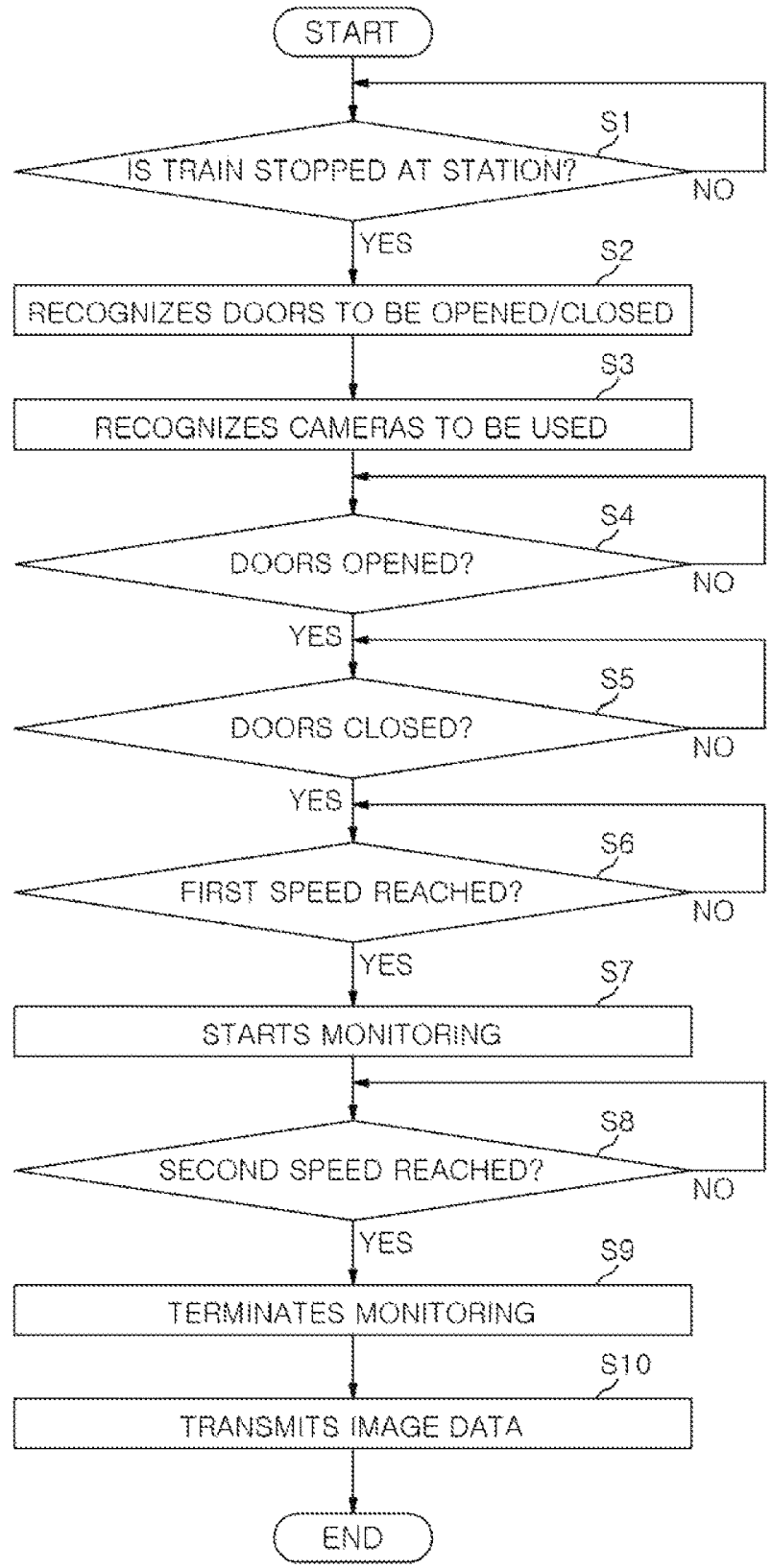
FIG. 4 is a flowchart showing an operation of the train monitoring device used in the train monitoring system according to an embodiment.

FIG. 4 is an example of a flowchart showing an operation of the train monitoring device 1 (the control unit 10) in the case of performing such imaging. First, the control unit 10 recognizes whether or not the train T on which the train monitoring device 1 is mounted is stopped at the station, using the speed recognition unit 15 (step S1). When it is recognized that the train stops (S1: Yes), which side the doors are to be opened/closed (opened) on, i.e., the side where the platform P is located, in the station where the train currently stops is recognized based on information from a command center of the station or the train crew's manipulation of the manipulation unit 11 (step S2). Here, when the platform P is located on the right side as shown in FIGS. 1 and 3, the door D13, D14, D23, and D24 are selected (step S2) and, the monitoring cameras are selected accordingly (step S3). Here, the monitoring cameras C02 and C23 are selected as the rear monitoring cameras as shown in FIG. 3.

Then, when the control unit 10 recognizes that the recognized door S2 is opened (S4: Yes) and then recognizes that this door is closed (S5: Yes), it is presumed that the train t departs thereafter. When the speed recognition unit 15 recognizes that the speed of the train T reaches a first speed that is slightly higher than 0 (S6: Yes), the control unit 10 can determine that the train T starts to move. Therefore, the monitoring (imaging) by the monitoring cameras C02 and C23 can be started at this time point (step S7).

Thereafter, the train T is gradually accelerated, so that the speed thereof increases. When the control unit 10 recognizes that the speed reaches a second speed (higher than the first speed) (S8: Yes), it is presumed that the train T has moved by a predetermined distance from the departure. Since the variation of speed of the train T at the same route position is not significantly large, the second speed can be determined as, e.g., the speed of the rearmost train at the time of passing through the vicinity of the front end of the platform P. By terminating the monitoring (imaging) at this point (step S9), there can be obtained the image data obtained by imaging the railroad behind the rear side of the train T and the platform P near the train from the top over substantially the entire region of the length of the platform P along the traveling direction, as described above. The control unit 10 can store this image data in the storage unit 13, and also transmit the image data to the outside together with the recognition information of the train T and the recognition information of the station using the wireless communication unit 14 (step S10). The central station 100 and the plurality of mobile stations 110 can quickly obtain the image data and the information.

Particularly in the mobile station 110 corresponding to the next train among the mobile stations 110, the crew of this train can check the image data obtained as described above on the display unit 12 of FIG. 2. Accordingly, when an abnormality occurs behind the rear side of the train, the abnormality can be quickly recognized by the next train. As the abnormality recognized as described above may be the case in which entrance of a next train is prevented until the abnormality is eliminated (the case in which an object falls on the railroad). On the other hand, although it is preferable that the next train recognizes the occurrence of abnormality, there may be an abnormal situation in which it is not necessarily needed to stop the next train (e.g., the case where the surface of the platform P is wet with water, or the like). In the former case, it is possible to deal with the abnormality by pressing the emergency stop switch, for example. However, in the latter case, the next train can recognize the abnormal situation due to the above configuration. In any cases, the next train T or the central station 100 can quickly recognize the content of the abnormality.

In the above example, the imaging start time point of the image data is when the speed of the train T reaches the first speed (S6), and the imaging end time point is when the speed of the train T reaches the second speed (S8). However, the imaging start timing and the imaging end timing may be appropriately set in different ways. For example, when the positional relationship of the train T with respect to the platform P is correctly recognized, the imaging start timing and the imaging end timing may be determined according to this position. Alternatively, the imaging may be performed for a certain period of time after the train departs or after the door is closed.

Further, for example, the acquired image data is analyzed by the central station 100, and when a serious abnormality is recognized, the same action as that in the case of manipulating the emergency stop switch, i.e., an instruction to transmit an alarm to another train T or to stop all or a part of the trains T on the railroad, can be transmitted. In this case, for example, the abnormality occurring on the railroad can be recognized by a well-known pattern recognition method or estimated using a pre-created learning model for determining the abnormality. In particular, in the above-described example, since the monitoring cameras C02 and C23 image the railroad and the platform P including the braille block W respectively, and the background images thereof are predetermined, it is easy to recognize whether or not an abnormality occurs using the pattern recognition method. Such determination can be made by the train monitoring device 1 that has performed the imaging or by the train monitoring device 1 that has received the imaging data. In any cases, it is preferable to share the information for stopping the train T between the central station 100 and all the trains T (the train monitoring devices 1).

In other words, it is preferable that the central station 100 or the train monitoring device 1 includes an image analyzing unit that performs image processing to recognize an abnormality such as the case in which a person or an object falls on the railroad, the case in which a person rolls over the platform P, or the case in which a person is in contact with the train on the platform P based on the image data. When the train monitoring device 1 includes the image analyzing unit and the image analyzing unit recognizes an abnormality, the control unit 10 controls the wireless communication unit 14 to immediately notify the central station 100 of the alarm indicating the detection of the abnormality. In this case, it is preferable to transmit the image data in which the abnormality is detected. Accordingly, the central station 100 can perform the same action as that in the case of manipulating the emergency stop switch. When the image analyzing unit of the train monitoring device 1 recognizes the abnormality, it is preferable that the control unit 10 outputs the alarm notifying the detection of the abnormality on the display unit 12, displays the image data on the display unit 12, and notifies the driver of the train T of the abnormality. Therefore, the driver can perform the same action as that in the case of manipulating the emergency stop switch.

In the above example, the monitoring camera on the rear end side of the train T and the monitoring camera on the rear end side of the lateral side of the train T facing the platform P are used as the rear imaging cameras. However, only one of them may be used as long as it is possible to sufficiently image an abnormality occurring behind the rear side of the train. Alternatively, a monitoring camera installed at a position different from the positions shown in FIG. 1 may be used as the rear imaging camera. In case a new camera by appropriately selecting a monitoring camera already installed for the purpose of monitoring passengers on the platform around the doors is appropriately selected and used as the rear imaging camera, there is no need to install a new camera. Alternatively, in this case, the monitoring camera selected as the rear imaging camera may be set to have a field of view different from that in the case of using the monitoring camera for the original purpose.

While certain embodiments of the present disclosure have been described, these embodiments have been presented by way of example only and it will be understood by those skilled in the art that various modifications can be made by combining elements in different embodiments, and such modifications are also within the scope of the present disclosure.

DESCRIPTION OF REFERENCE NUMERALS

1: train monitoring device
10: control unit
11: manipulation unit
12: display unit
13: storage unit
14: wireless communication unit
15: speed recognition unit
100: central station
110: mobile station
C11, C13, C21, C23: second side camera (monitoring camera:camera)
C12, C14, C22, C24: first side camera (monitoring camera:camera)
C01: first front camera (monitoring camera:camera)
C02: second front camera (monitoring camera:camera)
D11, D12, D13, D14, D21, D22, D23, D24: door
N: network
P: platform
T: train
T1: first railroad car
T2: second railroad car
W: braille block

The invention claimed is:

1. A train monitoring system using a train monitoring device that is mounted on a train and uses a plurality of cameras for imaging around the train from different sides,
    wherein the train monitoring device includes a control unit and a speed recognition unit configured to recognize a speed of the train,
    wherein the control unit is configured to:
    when the train stops at a station, select one of the plurality of cameras as a rear imaging camera for imaging a rear side in a traveling direction of the train based on a side where a platform is located;
    after the train departs from the station, acquire image data imaged by the rear imaging camera; and
    transmit the image data to the outside, and
    wherein the control unit is further configured to, when it is recognized that the train stops and a door of the train is opened and then the door of the train is closed, start imaging with the rear imaging camera when the speed recognized by the speed recognition unit reaches a first preset speed, stop the imaging by the rear imaging camera when the speed reaches a second preset speed higher than the first preset speed, and acquire the image data.

2. The train monitoring system of claim 1, wherein the train monitoring device transmits the image data to a central station fixed on the ground, and the central station includes an image analyzing unit configured to recognize abnormality based on the image data, and transmits an alarm to another train when the image analyzing unit recognizes the abnormality.

3. The train monitoring system of claim 1, wherein the control unit is configured to set a speed of a rearmost part of the train at the time of passing through a vicinity of a front end of the platform as the second preset speed.

4. The train monitoring system of claim 1, wherein the train monitoring device includes an image analyzing unit configured to recognize abnormality based on the image data, and a display unit configured to display the image data, and the control unit notifies the display unit or the outside of an alarm when the image analyzing unit recognizes the abnormality.

5. The train monitoring system of claim 4, wherein in the train, a first front camera of the cameras configured to image one end side at one end in the traveling direction and a second front camera of the cameras configured to image the other side at the other end in the traveling direction are installed, and in the train monitoring device, the control unit sets one of the first front camera and the second front camera as the rear imaging camera depending on the traveling direction.

6. The train monitoring system of claim 4, wherein in the train, a first side camera of the cameras configured to image one lateral side of the traveling direction and a second side camera of the cameras configured to image the other lateral side of the traveling direction are installed together on both lateral sides with respect to the traveling direction, in the train monitoring device, the control unit sets one of the first side camera and the second side camera on both lateral sides as the rear imaging camera depending on the traveling direction and the positional relationship between the train and a the platform.

7. The train monitoring system of claim 4, wherein the train monitoring device transmits the image data to a central station fixed on the ground, and the central station includes an image analyzing unit configured to recognize abnormality based on the image data, and transmits an alarm to another train when the image analyzing unit recognizes the abnormality.

8. The train monitoring system of claim 1, wherein in the train, a first front camera of the cameras configured to image one end side at one end in the traveling direction and a second front camera of the cameras configured to image the other side at the other end in the traveling direction are installed, and in the train monitoring device, the control unit sets one of the first front camera and the second front camera as the rear imaging camera depending on the traveling direction.

9. The train monitoring system of claim 8, wherein in the train, a first side camera of the cameras configured to image one lateral side of the traveling direction and a second side camera of the cameras configured to image the other lateral side of the traveling direction are installed together on both lateral sides with respect to the traveling direction, in the train monitoring device, the control unit sets one of the first side camera and the second side camera on both lateral sides as the rear imaging camera depending on the traveling direction and the positional relationship between the train and a the platform.

10. The train monitoring system of claim 8, wherein the train monitoring device transmits the image data to a central station fixed on the ground, and the central station includes an image analyzing unit configured to recognize abnormality based on the image data, and transmits an alarm to another train when the image analyzing unit recognizes the abnormality.

11. The train monitoring system of claim 1, wherein in the train, a first side camera of the cameras configured to image one lateral side of the traveling direction and a second side camera of the cameras configured to image the other lateral side of the traveling direction are installed together on both lateral sides with respect to the traveling direction, in the train monitoring device, the control unit sets one of the first side camera and the second side camera on both lateral sides as the rear imaging camera depending on the traveling direction and the positional relationship between the train and a the platform.

12. The train monitoring system of claim 11, wherein the train monitoring device transmits the image data to a central station fixed on the ground, and the central station includes an image analyzing unit configured to recognize abnormality based on the image data, and transmits an alarm to another train when the image analyzing unit recognizes the abnormality.

* * * * *